United States Patent Office 2,870,229
Patented Jan. 20, 1959

2,870,229

PRODUCTION OF META-DIISOPROPYL BENZENE

Adrianus de Keizer, Christiaan P. van Dijk, and Arthur A. Gips, Amsterdam, Netherlands, assignors to Shell Development Company, New York, N. Y., a corporation of Delaware No Drawing. Application November 1, 1956
Serial No. 619,687

Claims priority, application Netherlands
November 30, 1955

3 Claims. (Cl. 260—671)

This invention relates to the alkylation of benzene and/or cumene with propylene. More specifically, it relates to a process for the production of meta-diisobenzene of high purity.

It is a principal object of this invention to provide a commercially useful process for preparing meta-diisopropyl benzene in a single reaction step from isopropyl benzene and/or benzene and propylene.

The boiling points of meta- and ortho-diisopropyl benzene are so close that it is not possible to separate the compounds in a practical fractional distillation step. Processes heretofore disclosed for the production of meta-diisopropyl benzene combine a number of reaction steps such as alkylation and transalkylation or disproportionation in order to produce meta-diisopropyl benzene of low ortho isomer content.

It has now been found that it is possible, in accordance with this invention, to produce meta-diisopropyl benzene of high purity and of low ortho isomer content in a single alkylation step. Briefly, the process consists of contacting benzene and/or cumene (isopropyl benzene) with propylene in the presence of silica-alumina cracking type catalyst at a temperature in the range of 160° to 250° C., at a controlled low liquid hourly space velocity (L. H. S. V.) in the range of 0.1 to 4 vol./vol./hr., the higher space velocities being employed only at the higher temperatures in the defined range. Under these conditions a total product mixture is produced in which the diisopropyl benzene fraction contains as much as 45% meta-diisopropyl benzene and less than 5% ortho-diisopropyl benzene. This fraction is then further fractionated to produce meta-diisopropyl benzene of high purity containing less than 10%, and generally less than 5%, ortho-diisopropyl benzene.

In the alkylation process of this invention diisopropyl benzenes are produced by reaction of cumene with propylene. Benzene may be charged to the alkylation step to be converted to the required cumene in the single alkylation reaction zone. Some triisopropyl benzenes are generally formed in the reaction. Net production of triisopropyl benzenes can be suppressed by returning such compounds, which are recovered in the product fractionation, to the alkylation step to maintain a minor but substantial concentration, e. g., between 5 and 10 mole percent thereof, in the reaction mixture. If desired, triisopropyl benzene can be recovered as a by-product. It will be largely the symmetrical (1,3,5)-isomer substantially free of 1,2,3- and 1,2,4-triisopropyl benzene. Benzene and cumene recovered in the product fractionation are preferably returned to the alkylation step for further conversion. Para-diisopropyl benzene formed in the alkylation step is suitably recovered as by-product of the process.

Propylene is the only olefin which is employed in the alkylation step. It may be charged as a highly concentrated olefin stream or together with alkanes(s), especially propane. In petroleum refineries $C_3$-cuts recovered from cracking processes may contain from 20 to 80% or more propylene, the rest being essentially propane. Such cuts are suitable; it is preferred to have at least 40–50% propylene in the fraction employed.

The catalysts suitable in the present invention belong to the group of cracking catalysts, i. e. those substances which can also serve as catalysts in cracking of petroleum. The process according to the invention cracking catalysts of the silicate type are preferably used. These catalysts mainly consist of silica, while smaller quantities of one or more oxides of other metals, such as aluminum, zirconium, magnesium, calcium, sodium, and potassium, may also be present, usually chemically bound to the silica to form silicates. Other oxides, such as those of hydrogen, carbon and sulfur, may also occur in a chemically bound form. Usually, however, water is present in the oxide mass in a free or very loosely bound form. In many instances only traces of certain oxide components occur in the catalysts.

In the process according to the invention catalysts of the alumina-silica type are especially preferred, i. e. cracking catalysts mainly consisting of $Al_2O_3$ and $SiO_2$, in which other components, such as those mentioned, may be present in small quantities or traces. These catalysts usually have a higher $SiO_2$ than $Al_2O_3$ content. A suitable ratio by weight is, for example, 70–95% by weight of $SiO_2$ and 30–5% by weight of $Al_2O_3$.

It is desirable that the catalyst have a high activity. The water content of the catalyst has a great influence on the activity and catalysts having a water content greater than 3.5% by weight are not sufficiently active to be useful in the present invention. In general, water contents lower than 2% by weight, and preferably water contents between 0.1 and 0.2% by weight are particularly advantageous.

Control and correlation of the reaction conditions are essential to the successful operation of the present invention. The alkylation is carried out with the hydrocarbon in the liquid phase. The pressure in the alkylation zone is therefore maintained sufficiently high to maintain the mixture of reactants and product in the alkylation zone in liquid phase at the temperature employed. Pressures in the range from 10 to 80 atmospheres, absolute, are suitable.

The reaction temperature and the throughput rate, as liquid hourly space velocity expressed as volume of liquid reactants per bulk volume of catalyst per hour, are particularly important variables in the alkylation reaction and must be carefully correlated to achieve the desired result. A minimum temperature of 160° C. is required for the reaction. Temperatures as high as 250° C. or somewhat higher are suitable. The throughput rate must be maintained relatively low in order to obtain a product having a low ortho-diisopropyl benzene content. Thus, at a temperature of 200° C. the throughput rate may not exceed about 0.5 v./v./hr. while at 250° C. it may be as high as 5 v./v./hr., but is preferably 4 v./v./hr. or less. Although alkylation occurs at higher throughput rates the product produced under such conditions contains an excessive amount of ortho-diisopropyl benzene.

The ratio of aromatic to propylene in the feed mixture is generally in the range of 2:1 to 10:1. It is preferably in the higher part of the range. Varying this ratio does not substantially affect the isomer distribution in the product.

The following examples illustrate the present invention but are not to be considered as limitations thereon. In each example the alkylation was carried out in the presence of a synthetic catalyst of the aluminum silicate type.

Example I 90 ml. of powdered catalyst of the aluminum-silicate type were placed in a vertical reactor with a diameter of 200 mm. and a height of 870 mm.

A mixture of cumene, propylene and triisopropyl benzene in a molar ratio of 3:1:0.3 was passed at an L. H. S. V. of 5 upwardly through the reactor at a pressure of 60 atm. abs. and a temperature of 250° C.

The reaction product obtained was continuously separated by distillation into a fraction containing cumene and propylene, a diisopropyl benzene fraction and a triisopropyl benzene fraction. The first fraction was returned to the reactor together with the last fraction, a sufficient amount of cumene and propylene being supplied for the above-mentioned molar ratio to be reacted again.

Through a test period of 4 hours there was no noticeable change in the amount of triisopropyl benzene. The diisopropyl benzene fraction separated amounted to approximately 30 mol. percent of the reaction product and consisted of 53% para-, 45% meta- and 2% ortho-diisopropyl benzene. This fraction was distilled into the para isomer on the one hand and a meta isomer poor in ortho on the other hand.

Example II

The test described in Example I was repeated at a temperature of 200° C. In order to obtain the same results it was found necessary to reduce the L. H. S. V. to 0.5.

Example III

A further run similar to that of Example II was carried out by passing a mixture of cumene and propylene in a molar ratio of approximately 5:1 in contact with a silica alumina catalyst at a pressure of 60 atm. abs., at a temperature of 200° C. and a liquid hourly space velocity of 6 v./v./hr. The diisopropyl benzene fraction produced analyzed 53% para, 32% meta and 15% ortho isomer. Distillation to recover a meta-diisopropyl benzene concentrate produces a fraction containing over 30% ortho-diisopropyl benzene.

We claim as our invention:

1. A process for the production of meta-diisopropyl benzene which comprises contacting a compound selected from the group consisting of benzene and cumene with propylene in the presence of silica-alumina cracking type catalyst at a temperature in the range between 160° and 250° C. and at a liquid hourly space velocity between 0.1 and 4 v./v./hr., the higher space velocities being employed only at the higher temperatures in the defined range, to produce a total product mixture containing less than 10% ortho-diisopropyl benzene and recovering from said product mixture by fractional distillation a meta-diisopropyl benzene fraction containing less than 10% ortho-diisopropyl benzene.

2. A process according to claim 1 in which the ortho-diisopropyl benzene content of the total diisopropyl benzene fraction is less than 5% and that of the meta-diisopropyl benzene product is less than 2%.

3. A process according to claim 1 in which the reaction mixture contains between 5 and 10 mole percent triisopropyl benzene.

References Cited in the file of this patent

FOREIGN PATENTS

| | | |
|---|---|---|
| 526,955 | Belgium | Sept. 4, 1954 |
| 1,088,332 | France | Sept. 8, 1954 |
| 749,187 | Great Britain | May 23, 1956 |